United States Patent
Jung

(10) Patent No.: US 6,610,393 B1
(45) Date of Patent: Aug. 26, 2003

(54) LAMINATED PACKET FOR A PLASTIC SUBSTRATE AND METHOD FOR PRODUCING SUCH A LAMINATED PACKET

(75) Inventor: Michael Jung, Alzenau (DE)

(73) Assignee: Balzers und Leybold Duetschland Holding AG, Hanau (DE)

( * ) Notice: Subject to any disclaimer, the term of this patent is extended or adjusted under 35 U.S.C. 154(b) by 0 days.

(21) Appl. No.: 09/301,454

(22) Filed: Apr. 29, 1999

(30) Foreign Application Priority Data

Apr. 30, 1998 (DE) ......................................... 198 19 414

(51) Int. Cl.⁷ ................................................. B32B 7/02
(52) U.S. Cl. ....................... 428/213; 428/215; 428/216; 428/408; 428/447; 359/838
(58) Field of Search .................. 428/212, 215, 428/195, 216, 213, 408, 447; 359/838

(56) References Cited

U.S. PATENT DOCUMENTS

| | | | |
|---|---|---|---|
| 4,137,365 A | 1/1979 | Wydeven et al. | 428/412 |
| 5,294,464 A | 3/1994 | Geisler et al. | 427/489 |
| 5,378,284 A * | 1/1995 | Geisler et al. | 118/723 MR |
| 5,506,038 A | 4/1996 | Knapp | 428/216 |
| 5,641,559 A | 6/1997 | Namiki | 408/216 |
| 5,718,967 A | 2/1998 | Hu et al. | 428/216 |

FOREIGN PATENT DOCUMENTS

| | | |
|---|---|---|
| DE | 3128022 | 1/1984 |
| DE | 3828098 | 3/1990 |
| DE | 4126759 | 2/1993 |
| DE | 19634334 | 2/1998 |
| EP | 0529268 | 3/1993 |
| GB | 2111064 | 6/1983 |
| WO | 85/04601 | 10/1985 |
| WO | 92/05951 | 4/1992 |
| WO | 92/06843 | 4/1992 |
| WO | 95/23652 | 9/1995 |
| WO | 97/13802 | 4/1997 |

OTHER PUBLICATIONS

Patent Abstracts of Japan vol. 12, No. 354, Sep. 22,1988 JP 63 106703 May 11, 1988.
"Hard–Coat–Processing in Thin–Layer–Technology", Coating 2/97, p. 56.

* cited by examiner

Primary Examiner—Bruce H. Hess
Assistant Examiner—B. Shewareged
(74) Attorney, Agent, or Firm—Smith, Gambrell & Russell LLP

(57) ABSTRACT

A laminated packet or layered coating system is applied onto plastic eyeglasses which is composed of several superposed coating sequences of a coating of TMDS of approximately 1 $\mu$, a hardened TMDS coating of approximately 0.2 $\mu$m and a separating coating of approximately 3–5 nm. The laminated composite contains on the outside a non-hardened coating of TMDS and a cover coating approximately 10–15 nm thick on it. The separating coating is produced in a plasma using methanol. The deposition of the hardened coating of TMDS takes place in the presence of oxygen bound in alcohol.

13 Claims, No Drawings

LAMINATED PACKET FOR A PLASTIC SUBSTRATE AND METHOD FOR PRODUCING SUCH A LAMINATED PACKET

INTRODUCTION AND BACKGROUND

The present invention relates to a transparent, hard, laminated or layered packet comprising at least one coating of TMDS (tetramethyldisiloxane) and a top coating of TMDS hardened by oxidation. Furthermore, the present invention relates to a method for producing such a layered system on a plastic substrate in which the substrate is first coated with TMDS (tetramethyldisiloxane) and then a top coating of TMDS hardened by oxidation is applied thereupon.

Plastic substrates must frequently be provided with a transparent coating as protection against scratching and wear. This is the case, for example, with eyeglasses made of plastic because they would be scratched without such protection against scratching if a hard grain of dust would be on the eyeglasses when being cleaned with a cloth. Protection against scratching is also desirable on protective glasses for the lenses of motor-vehicle headlights, especially when the protective lenses are cleaned by wipers. A coating of protection against scratches is also desirable for compact disks and displays.

Up to the present, eyeglasses were first provided with a soft coating of TMDS and then with a coating of TMDS, oxidized during deposition in the plasma by pure oxygen and hardened as a result of the oxidation reaction. However, such a laminated system does not meet the current, very stringent requirements placed on eyeglasses. Such coatings are often destroyed, especially in the boiling test, because not all OH groups can be removed in the TMDS by the oxygen or, alternatively, they re-form. Even the other tests customary for eyeglasses, for example, the scratch test with a rubber eraser, the tumble test in a rotating drum with various added materials, the impact test and the temperature test only yield unsatisfactory results in the case of the known coating systems. That also applies to plastic glasses with vaporized-on quartz and to plastic glasses with coatings applied by wet chemical processes.

Therefore, an object of the present invention is to meet the high requirements placed on coatings for eyeglasses with a coating system having as high a transparency as possible in the optically visible spectrum and in the range close to the UV.

It is a further object of the present invention to provide, a method of producing such a laminated coating system.

SUMMARY OF THE INVENTION

The above and other objects of the invention can be achieved with several coating sequences comprising in each instance TMDS and hardened TMDS superposed over each other and by locating a thin, transparent separating coating of carbon between each such coating sequence.

Such separating coatings, which can be so thin that the transparency of the coating system does not suffer, can be used to produce a relatively thick coating system consisting of several coinciding coating sequences which system has a high degree of flexibility in spite of great hardness because the columnar growth in the TMDS coatings is interrupted by this separating coating. As a result of the non-hardened TMDS coatings the ball impact test, for example, can be reliably passed without peeling or chipping off occurring.

The substrate is especially well protected against scratching if the layered coating system comprises a non-hardened coating of TMDS on the outer side and a transparent cover coating of carbon applied onto it. The carbon coating adheres on the unhardened TMDS much better than on hardened TMDS so that a peeling off need not be feared.

DETAILED DESCRIPTION OF INVENTION

In the case of plastic eyeglasses the optimal dimensioning of the coating system was found to be when the TMDS coating is approximately 1 $\mu$m, the hardened coating of TMDS approximately 0.2 $\mu$m, the separating coating approximately 3–5 nm and the cover coating approximately 10–15 nm thick.

The creation of a layered coating system on a plastic substrate, is achieved in accordance with the invention in that at least another, coinciding coating sequence is applied onto the coating sequence of TMDS and hardened TMDS and that a separating coating of carbon is formed between each coating sequence.

Such a laminated packet can be applied, e.g., by means of an RF plasma reactor. An average RF power output is used for the soft TMDS coatings whereas for the hardened TMDS coatings and the separating coatings a high RF power is required. All plasma processes operate at pressures between 0.1 to $20 \times 10^{-3}$ mbar. The layered coating system of the invention meets all currently customary tests for plastic eyeglasses and is distinguished in particular by great scratch resistance and hardness with great elasticity at the same time and, as a result, security against delamination.

According to an advantageous further aspect of the method of this invention, the layered coating is provided on the outside with a non-hardened coating of TMDS and with a transparent cover coating of carbon applied onto it. Such a cover coating increases the scratch resistance even more without any danger of peeling off.

The carbon for producing the separating coating and the cover coating can be deposited especially well for forming $\alpha$ carbon if the deposited coating and the cover coating are deposited in a plasma consisting of 1-hexene as initial substance.

The oxidation process during the production of the TMDS coating proceeds slower than with pure oxygen and can be regulated in an especially sensitive manner if, according to another further development of the method, the oxygen is supplied as oxygen chemically bound in an alcohol for hardening the TMDS coating. This oxidation process by means of an alcohol can also be used for permeation blocking-coating systems which are deposited on a TMDS base. This type of oxidation is furthermore suited for all other oxidation processes of siloxanes in plasma. It is especially advantageous if the alcohol is methanol.

EXAMPLE

An exemplary application for the method in accordance with the invention is given below:

At first, a non-hardened coating of TMDS of approximately 1 $\mu$m in thickness was applied onto plastic eyeglasses in an RF plasma reactor at average RF power at pressures between 0.1 to $20 \times 10^{-3}$ mbar. Thereafter, a coating of TMDS hardened by oxygen and of approximately 0.2 $\mu$m was applied onto the first coating in the RF plasma reactor at the same pressure but at a higher RF power output. The oxygen was supplied as oxygen chemically bound in methanol. The hardened coating of TMDS was coated with a separating coating of carbon approximately 3–5 nm thick. A non-hardened coating of TMDS of approximately 1 $\mu$m was again produced on this layered coating in the same manner and a hardened coating of TMDS of 0.2 μm produced on top of it. For the uppermost coating a carbon coating with a thickness of 10–15 nm was applied as cover coating. Both the separating coating and the cover coating were deposited in a plasma of 1-hexene as initial substance.

The layered protective coating produced in this manner on plastic eyeglasses has a very high hardness and is nevertheless highly flexible. This produces a high protection against scratches. The plastic eyeglasses with such a laminated protective layer can pass the customary ball impact test without any peeling or separation. Furthermore, the plastic eyeglasses exhibit a high transparency in the optically visible spectrum and in the range close to the UV.

Further variations and modifications of the foregoing will be apparent to those skilled in the art and are intended to be encompassed by the claims appended hereto.

German priority application 198 19 414.5 is relied on and incorporated herein by reference.

I claim:

1. A plastic article having, deposited on at least a surface thereof a transparent, hard, laminated layer, wherein the transparent, hard, laminated layer includes: a first coating sequence including a first layer of tetramethyldisiloxane and a first layer of tetramethyldisiloxane hardened by oxidation; a second coating sequence including a second layer of tetramethyldisiloxane and a second layer of tetramethyldisiloxane hardened by oxidation; and a thin, transparent separating coating of carbon located between the first coating sequence and the second coating sequence.

2. The plastic article according to claim 1, wherein an outer surface of said transparent, hard, laminated layer is coated with a non-hardened top coating of tetramethyldisiloxane, and a transparent cover coating of carbon is applied to said top coating.

3. The plastic article according to claim 2, wherein the first layer of tetramethyldisiloxane is approximately 1μ thick, the first layer of tetramethyldisiloxane hardened by oxidation is approximately 0.2 μm thick, and the separating coating of carbon is approximately 3–5 nm thick.

4. The plastic article according to claim 3, wherein said cover coating of carbon is approximately 10–15 nm thick.

5. The plastic article according to claim 1, wherein tile first layer of tetramethyldisiloxane is approximately 1μ thick, the first layer of tetramethyldisiloxane hardened by oxidation is approximately 0.2 μm thick, and the separating coating of carbon is approximately 3–5 nm thick.

6. The plastic article according to claim 5, wherein an outer surface of said transparent, hard, laminated layer is covered with a coating including an outer cover coating of carbon of approximately 10–15 nm thick.

7. The plastic article according to claim 1, wherein an outer surface of said transparent, hard, laminated layer is covered with a coating including an outer cover coating of carbon.

8. The plastic article according to claim 1, which is an eyeglass.

9. The plastic article according to claim 1, which is a compact disk.

10. The plastic article according to claim 1, which is a lens for an automotive headlight.

11. A method for producing the plastic article according to claim 1, comprising: coating the plastic article with the first coatings sequence including the first layer of tetramethyldisiloxane and the first layer of tetramethyldisiloxane hardened by oxidation; coating the first coating sequence with the thin, transparent separating coating of carbon; and coating the separating coating of carbon with the second coating sequence including the second layer of tetramethyldisiloxane and the second layer of tetramethyldisiloxane hardened by oxidation.

12. A method for producing the plastic article according to claim 2, comprising: coating the plastic article with the first coating sequence including the first layer of tetramethyldisiloxane and the first layer of tetramethyldisiloxane hardened by oxidation; coating the first coating sequence with the thin, transparent separating, coating of carbon; coating the separating coating of carbon with the second coating sequence including the second layer of tetramethyldisiloxane and the second layer of tetramethyldisiloxane hardened by oxidation; coating the second coating sequence with the non-hardened top coating of tetramethyldisiloxane; and applying the transparent cover coating of carbon to the top coating.

13. A method for producing the plastic article according to claim 7, comprising: coating the plastic article with the first coating sequence including the first layer of tetramethyldisiloxane and the first layer of tetramethyldisiloxane hardened by oxidation; coating the first coating sequence with the thin, transparent separating coating of carbon; coating the separating coating of carbon with the second coating sequence including the second layer of tetramethyldisiloxane and the second layer of tetramethyldisiloxane hardened by oxidation; and coating the second coating sequence with the coating layer including the outer cover coatings of carbon.

* * * * *